Aug. 1, 1961 D. B. JAMES 2,994,832

TRANSISTOR AMPLIFIER

Filed April 8, 1958 2 Sheets-Sheet 1

INVENTOR
D. B. JAMES

BY

R. C. Winter
ATTORNEY

INPUT-OUTPUT CHARACTERISTIC OF THE COMPLETE AMPLIFIER

INVENTOR
D. B. JAMES

BY R. C. Winter
ATTORNEY

United States Patent Office 2,994,832

Patented Aug. 1, 1961

2,994,832

TRANSISTOR AMPLIFIER

Dennis B. James, Murray Hill, N.J., assignor to Bell Telephone Laboratories, Incorporated, New York, N.Y., a corporation of New York Filed Apr. 8, 1958, Ser. No. 727,194
8 Claims. (Cl. 330—13)

This invention relates generally to signal amplifier circuits and more particularly, although not exclusively, to direct-coupled transistor signal amplifier circuits suitable for use in time division communication systems.

In applications such as communication systems operating on a time division basis, it is desirable that amplifying means provide faithful amplified images of a wide range of input signals. Such amplifying means, incorporated in a common transmission link of a telephone system, is required to pass information between a large number of telephone stations sharing the common link. It is evident that reliability is a paramount requirement of amplifying means used in this environment.

In the past audio frequency amplifiers of the "push-pull" variety have been used extensively to obtain increased power output with low signal distortion. The use of semiconductor devices for push-pull amplification has been priorly shown to have distinct advantages over the use of electron discharge devices. Thus, parallel connection of a pair of transistors of opposite conductivity types between input and output terminals, referred to as "complementary-symmetry," provides a push-pull amplifier which obviates the need for costly balanced elements such as transformers required in conjunction with vacuum tubes.

The transistor push-pull amplifier as known in the art has flexibility in its connections to permit voltage or current gain. Proper matching of amplifier output impedance with the low input impedance of a transmission line while retaining the excellent frequency response of a feedback amplifier makes the emitter-follower type connection attractive in applications such as time division communication systems. Such a connection may be likened to the cathode-follower connection for vacuum tubes and comprises coupling the input to the base electrodes and the output to the emitter electrodes with the collector electrodes common to input and output circuits. The emitter-follower or common collector type operation results in good current amplification with approximately unity voltage gain. Also, in view of the signal control exercised by the load, an emitter-follower will reproduce signal changes more faithfully in one direction; e.g., the negative-going edge of an input signal to a P-N-P transistor. The cooperative influence of two emitter-followers connected in complementary-symmetry, so as to accurately reproduce signal changes in opposite directions, reduces transient delays and improves the quality of the complete output signal.

It is advantageous in many applications, including time division communication systems, to utilize direct-coupled amplifiers in order to assure accurate reproduction of low level as well as high level signals. Direct coupling of a push-pull transistor amplifier, however, presents problems comparable to those encountered in direct-coupled vacuum tube amplifiers; viz., maintaining adequate grid bias, overcoming inherent instability and achieving satisfactory transient response. The solution of such problems for proper operation of the basic transistor amplifier may require complex and costly input circuitry which is economically unwarranted and may prove inadequate in continuous operation over a lengthy period.

Additionally, the push-pull transistor amplifier provides good reproduction with high efficiency when operated in class B or C, but the transistors as connected for push-pull operation inherently produce a region of zero gain or hole in the input-output voltage characteristic proximate the transition from positive to negative input signals such that low level signals may be lost in the amplifier despite direct coupling. Such a deficiency is intolerable in voice frequency transmission networks demanding faithful reproduction of the complete range of information signals. By operating such an amplifier in classes A or AB, the hole in the voltage characteristic may be minimized, but the sacrifice of efficiency and increased precision, demanded for direct coupling in such classes of operation, indicates the imprudence of such an approach.

It is therefore an object of this invention to provide an efficient, direct-coupled transistor amplifier.

It is another object of this invention to provide a highly reliable and rugged amplifying means.

It is a further object of this invention to provide a transistor amplifier capable of faithful and accurate reproduction of a wide range of signal information including extreme low level signals.

In its principal aspect, the invention comprises a power stage having a pair of transistors connected in complementary-symmetry and a corrective stage having a pair of transistors connected in the same manner as the power stage and driven by a difference amplifier. The input signal is direct-coupled to the amplifier, and a large current gain with extremely accurate reproduction of all input signals is achieved.

The power stage transistors are of opposite conductivity types connected such that the input signal is applied to their commonly connected bases, and the output signal is taken from their commonly connected emitters, thus forming an emitter-follower or common-collector stage. The transistors, operated in class B, are arranged to conduct on receipt of input signals of opposite polarities to provide the desired amplified output signal to the load. Advantageously, no direct current flows through the two transistors in series. In this configuration, the transistors require a finite emitter-base voltage which may result in such a region of zero gain or hole appearing in the input-ouput voltage characteristic. The resultant distortion at low signal levels is compensated by operation of the balance of the amplifier circuit in accordance with this invention.

The second or corrective stage comprises a difference amplifier driving a second pair of push-pull emitter-followers connected in the same fashion as the first stage. The difference amplifier advantageously comprises a first transistor acting as an emitter-follower to apply the input signal received at its base through the low impedance path of its emitter to the emitter of a second transistor which provides the amplified difference. The latter transistor also receives at its base the output signal fed back from the push-pull amplifiers and effectively amplifies the amount by which it differs from the input signal. The difference amplifier output drives the push-pull emitter-followers in its stage, thereby assuring an exact reproduction of the amplifier input at the load.

In accordance with one aspect of the invention, the corrective stage, comprising difference amplifier and push-pull emitter-followers, is sufficient to implement satisfactorily applications displaying high impedance loads. This is evidenced by the fact that saturation of the transistors in this stage occurs at a voltage which is dependent upon the size of the load. Thus, with low impedance loads as frequently encountered, for example, in time division transmission, the corrective stage alone is unable to provide the requisite power without undue transistor dissipation, and it is therefore coupled to the power stage. With high impedance loads, however, saturation is deferred to power levels adequate to satisfy the requirements of the application with the corrective stage alone.

In accordance with another aspect of the invention, the output power of the two stage amplifier is limited by the differing response times of the two amplifier stages which may cause the push-pull transistors to lock up and drain heavy currents from the supply voltages upon receipt of unusually high input signals. The signal voltage at which this occurs, and thus the maximum safe output power of the amplifier, may be increased by insertion of a small resistance in series with each emitter of the push-pull transistor pairs.

In accordance with a further aspect of the invention, the unique amplifier arrangement is adaptable in many applications displaying capacitive loads to operation in conjunction with an inductance in the output lead to reduce dissipation in the amplifier, thereby realizing a voltage gain of approximately two.

It is a feature of this invention that an amplifier comprise a pair of transistors connected in complementary-symmetry and a difference amplifier coupled to receive the amplifier input signal and the output of the pair of transistors.

It is another feature of this invention that an amplifier comprise a power stage having a pair of transistors connected in complementary-symmetry and a corrective stage having a differential amplifier coupled to the output of the power stage.

It is yet another feature of this invention that the corrective stage comprise a pair of transistors connected in complementary-symmetry and coupled to receive the differential amplifier output.

It is still another feature of this invention that the emitter electrodes of each pair of transistors connected in complementary-symmetry provide the amplifier output and are coupled to one input of the differential amplifier.

It is a further feature of this invention that the amplifier input be direct-coupled to each stage of the amplifier.

It is a feature of one aspect of this invention that a resistance be connected to each emitter electrode of the transistors operated in complementary-symmetry.

It is a feature of another aspect of this invention that an inductance be connected to the amplifier output.

A complete understanding of this invention and of these and other features thereof may be gained from consideration of the following detailed description and the accompanying drawing, in which.

Figure 1:
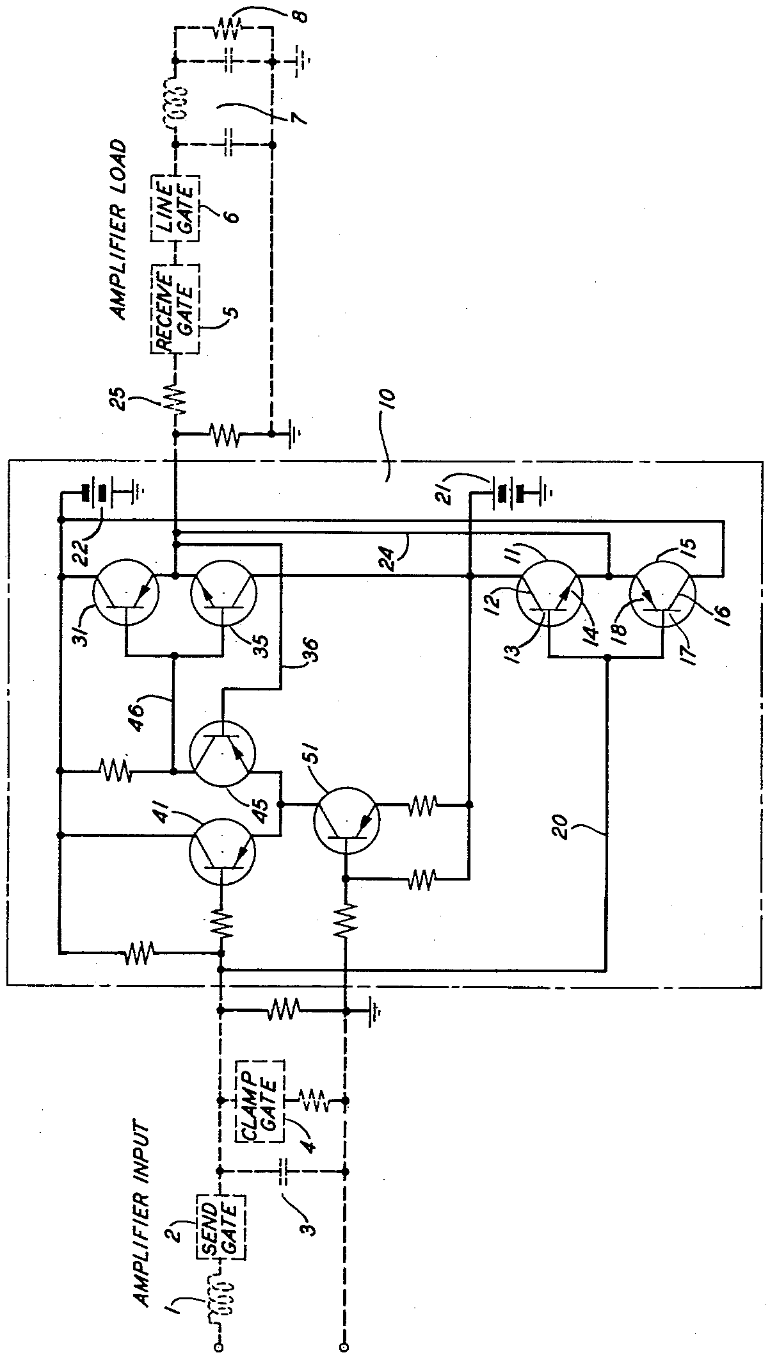
FIG. 1 is a schematic diagram of a transistor amplifier embodying the invention.

Turning now to the drawing, FIG. 1 depicts the amplifier 10 in a common transmission channel of a time division communication system of the type disclosed, for example, in a patent application of D. B. James and J. D. Johannesen Serial No. 702,149, filed December 11, 1957, now Patent No. 2,936,338, issued May 10, 1960. This environment is disclosed merely to illustrate the amplifier's utility, and its application is not confined to such systems alone.

The amplifier input and load are shown as comprising circuit elements encountered in the common transmission channel of a time division system including an inductance 1, send gate 2, storage capacitance 3, clamp gate 4, receive gate 5, line gate 6, filter 7, and a load resistance 8, representing the receiving instrument. Information is transferred through the inductance 1 to the storage capacitance 3 during a discrete time interval in which the use of the common transmission channel is allotted to a pair of terminals in communication. The stored signal is then amplified by amplifier 10 and transferred through the receive gate 5 of the common medium and the line gate 6 at the receiving terminal. The clamp gate 4 is then operated to remove any signal remaining in the storage capacitance 3 preparatory to sampling other pairs of terminals in communication for transfer of information over the common medium during succeeding time intervals. It may be appreciated that the transmission of small audio signal samples in the allotted brief time interval over considerable distances requires amplifying means which will provide precise reproduction of all signal levels with sizable gain.

The amplifier 10 comprises a power stage and a corrective stage. The power stage includes two junction transistors 11 and 15 which are of opposite conductivity types. For example, transistor 11 is of the N-P-N type while transistor 15 is of the P-N-P type. Transistor 11 has a collector electrode 12 in contact with one N type zone, a base electrode 13 in contact with the P type zone and an emitter electrode 14 in contact with the other N type zone. Similarly transistor 15 includes a collector electrode 16 in contact with one P type zone, a base electrode 17 in contact with the N type zone and an emitter electrode 18 in contact with the other P type zone. The base electrodes 13 and 17 are direct-current coupled to one side of the amplifier input over input lead 20.

A positive voltage source, shown as battery 21, is connected to collector 12 of transistor 11 and a negative voltage source, shown as battery 22, is connected to collector 16 of transistor 15. The emitter electrodes 14 and 18, which function as the output electrodes in this emitter-follower type operation, are coupled to the load over output lead 24 and through resistance 25. The collector electrodes 12 and 16 are common to both the input and output circuits of their respective transistors.

A negative signal voltage applied to the base electrodes 13 and 17 will cause amplified current flow through the load and into the emitter electrodes 18 of P-N-P transistor 15, considering for convenience the conventional concept of current flow toward areas of less positive potential, while no current flows into the load from N-P-N transistor 11. When the polarity of the input signal reverses and a positive potential is applied to the base electrodes 13 and 17, an amplified current will flow from the emitter electrode 14 of transistor 11 into the load while transistor 15 is not conducting through the load. Thus an alternating signal wave will appear in amplified form in the load impedance.

Figure 2:
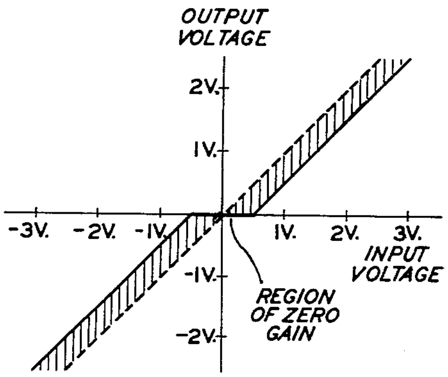
FIG. 2 is an input voltage versus output voltage characteristic for the power stage of the amplifier shown in FIG. 1.

FIG. 2 represents the input-output voltage characteristic of the power stage of the amplifier 10. The dotted line indicates the desired characteristic, but absent any base-emitter bias in the direct-coupled circuit of this invention, the voltage drop in the internal resistance of the base-emitter junction must be provided by the input signal. The shaded area of FIG. 2 indicates the voltage requirement of the base-emitter junction, and it may be noted that this requirement in the push-pull arrangement results in an area at low level input signals in which all of the signal is absorbed in this junction resistance, and no output signal is obtained. This region is indicated as the region of zero gain in FIG. 2, and changes the class B operation to slightly class C. This condition of course prevents the faithful reproduction by the power stage alone of low level signals, and the resultant distortion is particularly objectionable in applications such as the time division communication system depicted. Such distortion may be minimized by biasing the power stage to operate in class A or AB. However, the consequent reduction in efficiency resulting from increased transistor dissipation as well as increased difficulty in direct coupling renders such operation impractical. Also, with a forward bias for operation in class A or AB, large signal inputs may cause the transistors 11 and 15, connected in series, to lock up and drain heavy currents from the supply voltage sources due to the resulting high energy dissipation in the transistors.

In accordance with the instant invention, the power stage of amplifier 10 is operated in class B or, more correctly, slightly class C, and the distortion indicated by the region of zero gain is overcome by combining the power stage with a corrective stage. The corrective stage comprises a second pair of transistors, 31 and 35, connected in complementary-symmetry and driven by a difference amplifier including P-N-P transistors 41, 45 and 51.

Transistors 31 and 35 are of opposite conductivity types and are connected to operate as emitter-followers in like manner to the transistors 11 and 15 of the power stage. This push-pull arrangement of transistors 31 and 35 operates in class C with feedback over lead 36 from its output, as well as from the power stage output on lead 24, to one input of the difference amplifier at the base of transistor 45. The difference amplifier itself operates in class A. The gain of transistor 45, receiving the output signals fed back from transistors 31 and 35, serves to overcome substantially all of the distortion which may be present in this stage in accordance with well-known feed-back principles.

The amplifier input signal is received at the base of transistor 41 which acts as an emitter-follower to provide the signal in a low impedance path to the emitter of transistor 45. Transistor 45 provides the difference between the applied signals and transmits the amplified result from its collector over lead 46 to the bases of transistors 31 and 35. This difference amplifier arrangement requires a high resistance to ground in the emitter paths of transistors 41 and 46. Advantageously, transistor 51 is connected to provide the desired high resistance while maintaining a constant current. Thus the collector of transistor 51 is connected to the emitters of transistors 41 and 45 and the emitter-base junction of transistor 51 is forward biased.

The input signals received at the bases of transistors 41 and 45 are nearly identical over the majority of the input cycle, and little output signal is derived from the corrective stage during this time. In the region of zero gain of the power stage, however, there is no feedback input signal applied to transistor 45 while a finite signal appears at the input to transistor 41. During this interval therefore, the differential amplifier provides an output signal to drive the transistors 31 and 35. The connection of transistors 31 and 35 in complementary-symmetry identical to that of the power stage provides additional amplification of the difference signal to follow the gain of the power stage.

Figure 3:
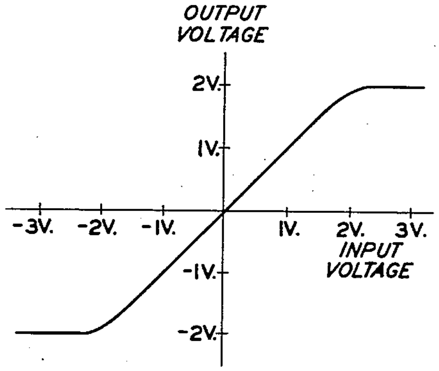
FIG. 3 is the characteristic for the corrective stage of the amplifier shown in FIG. 1.

The voltage characteristic of the corrective stage is thus as shown in FIG. 3. The difference amplifier, being operated in class A, is limited in its power handling capacity by the allowed dissipation of the transistors, which in turn dictates the amount of current that the emitter-followers 31 and 35 can supply to the load and thus limits the corrective stage output voltage for a given load resistance. Advantageously, the difference signal required to be amplified by the corrective stage in conjunction with the power stage is always well within acceptable limits so that the transistors are protected against possible burnout from undue dissipation. Nevertheless, with higher impedance loads than contemplated in the instant application, the power handling capacity of the corrective stage alone may be adequate.

Figure 4:
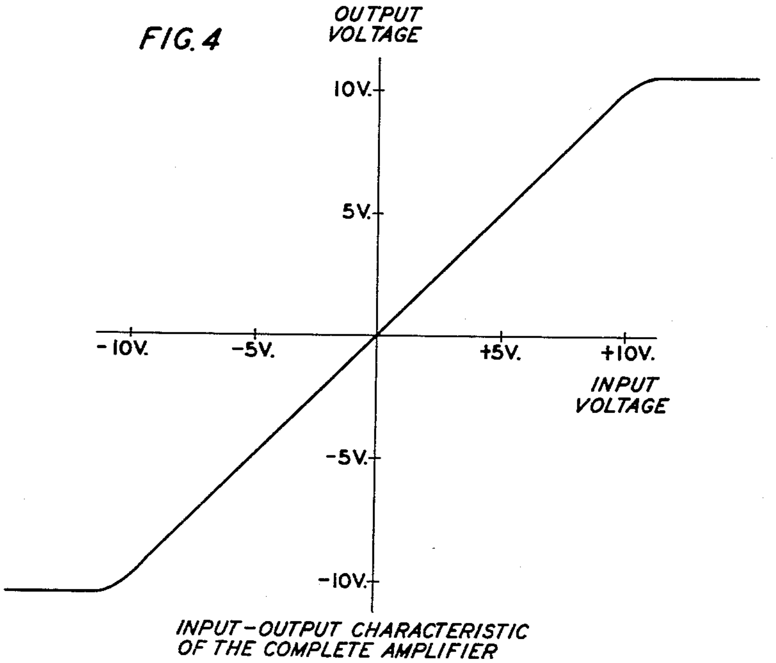
FIG. 4 is the characteristic for the entire amplifier shown in FIG. 1.

The cooperative operation of corrective stage and power stage provides a combined input-output voltage characteristic, as shown in FIG. 4, affording a smooth transition and faithful reproduction of signals over a sizable range.

With unusually large input signals, it is possible for the push-pull transistors to lock up and drain heavy currents from the supply voltages due to differing response times of the two amplifier stages. Thus an upper limit on the output power of the amplifier is reached. The signal voltage at which this occurs may be increased by inserting a small resistor in series with each emitter lead of the transistors 11, 15, 31 and 35, replacing the common output resistor 25 shown in FIG. 1.

Also, in some applications, the resistor 25 may be replaced by an inductance which would serve to reduce transistor dissipation and permit an appreciable voltage gain when operating into a capacitive load.

It is to be understood that the above-described arrangements are illustrative of the application of the principles of the invention. Numerous other arrangements may be devised by those skilled in the art without departing from the spirit and scope of the invention.

What is claimed is:

1. A signal amplifier circuit comprising a pair of transistors connected in complementary-symmetry and biased for class B operation, a difference amplifier, means comprising direct-current coupling means, for transmitting an input signal simultaneously to first corresponding electrodes of said transistors and to a first input of said difference amplifier, means for direct-current connecting the output taken from second corresponding electrodes of said transistors to a load and to a second input of said difference amplifier, and means connecting the difference amplifier output to the load.

2. A signal amplifier circuit comprising a difference amplifier, first and second pairs of transistors, each of said pairs connected in complementary-symmetry, means for direct-current coupling a signal source to a first input of said difference amplifier and to said first pair of transistors, means for biasing said first pair of transistors class B, feedback means connected from the output of said first and second pairs of transistors to a second input of said difference amplifier, means coupling a load to said feedback means, and means coupling the output of said difference amplifier to said second pair of transistors.

3. A signal amplifier comprising first and second pairs of transistors, each pair being connected in complementary-symmetry and said first pair being biased class B, and a difference amplifier, a signal source, means comprising direct-current coupling means for transmitting an input signal from said source simultaneously to said first pair of transistors and to a first input of said difference amplifier, means connecting the output of said difference amplifier to the input of said second pair of transistors, and means for direct-current connecting the outputs of said pairs of transistors to a load and to a second input of said difference amplifier.

4. A signal amplifier circuit comprising first and second pairs of transistors, each transistor having input, common, and output electrodes, a difference amplifier, means for direct-current connecting a signal source to a first input of said difference amplifier and to said input electrodes of each of said first pair of transistors, means biasing said first pair of transistors class B, means connecting the output of said difference amplifier to said input electrodes of said second pair of transistors, and means for direct-current connecting said output electrodes of said first and second pairs of transistors to a load and to a second input of said difference amplifier.

5. A signal amplifier comprising a first stage including a pair of transistors of opposite conductivity types and biased class B, each having emitter, collector, and base electrodes, means for direct-current coupling a signal source to said base electrodes, and means for direct current coupling a load to said emitter electrodes, and a second stage including a second pair of transistors of opposite conductivity types, each having emitter, collector, and base electrodes, means connecting said load coupling means to the emitter electrodes of said second pair of transistors, and a difference amplifier having a first input connected to said signal source coupling means, a second input connected to said load coupling means and an output connected to the base electrodes of said second pair of transistors.

6. A signal amplifier circuit in accordance with claim 5 wherein said load coupling means comprises an output resistor common to said emitter electrodes.

7. A signal amplifier in accordance with claim 5 and further comprising a resistor connected between each of said emitter electrodes and said load coupling means.

8. A signal amplifier circuit comprising first push-pull transistor amplifying means biased class B, difference amplifying means, means for direct-current coupling an input signal source to said first amplifying means and to a first input of said difference amplifying means, second push-pull amplifying means, means for direct-current coupling the output of said difference amplifying means to the input of said second amplifying means, and means for direct-current coupling the outputs of said first and second amplifying means to a second input of said difference amplifying means and to a load.

References Cited in the file of this patent

UNITED STATES PATENTS

| | | |
|---|---|---|
| 2,393,709 | Romander | Jan. 29, 1946 |
| 2,485,538 | Rowe | Oct. 18, 1949 |
| 2,789,164 | Stanley | Apr. 16, 1957 |
| 2,855,468 | Lohman | Oct. 7, 1958 |
| 2,965,852 | Macdonald | Dec. 20, 1960 |

FOREIGN PATENTS

| | | |
|---|---|---|
| 114,006 | Australia | Oct. 7, 1941 |
| 1,004,668 | Germany | Mar. 21, 1957 |

OTHER REFERENCES

Slaughter: "Feedback-Stabilized Transistor Amplifier," Electronics, May 1955, pages 174—175.

McKinley et al.: "Transistor Amplifier for Medical Recording," Electronics, Aug. 1, 1957, pages 161–163.